US010687348B2

(12) United States Patent
Zhang et al.

(10) Patent No.: US 10,687,348 B2
(45) Date of Patent: Jun. 16, 2020

(54) HYBRID MULTIBAND AND SUBBAND SCHEDULING IN MULTI-USER SUPERPOSITION TRANSMISSION

(71) Applicant: Telefonaktiebolaget LM Ericsson (publ), Stockholm (SE)

(72) Inventors: Zhang Zhang, Beijing (CN); Mattias Frenne, Uppsala (SE); Shiwei Gao, Nepean (CA); Robert Mark Harrison, Grapevine, TX (US); Bo Lincoln, Lund (SE); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/078,880

(22) PCT Filed: Feb. 23, 2016

(86) PCT No.: PCT/CN2016/074308
§ 371 (c)(1),
(2) Date: Aug. 22, 2018

(87) PCT Pub. No.: WO2017/143503
PCT Pub. Date: Aug. 31, 2017

(65) Prior Publication Data
US 2019/0059098 A1    Feb. 21, 2019

(51) Int. Cl.
*H04W 72/12* (2009.01)
*H04L 5/00* (2006.01)
(Continued)

(52) U.S. Cl.
CPC ........ *H04W 72/1278* (2013.01); *H04B 1/711* (2013.01); *H04B 15/02* (2013.01);
(Continued)

(58) Field of Classification Search
CPC ......... H04W 72/1278; H04W 72/0453; H04W 72/0473; H04B 1/711; H04B 15/02; H04L 5/0091; H04L 5/0057; H04L 5/003
See application file for complete search history.

(56) References Cited

U.S. PATENT DOCUMENTS 8,116,779 B2 *  2/2012  Iwamura ............... H04L 1/0027
                                                                370/208
8,259,658 B2 *  9/2012  Nishio .................... H04B 7/12
                                                                370/329
(Continued)

FOREIGN PATENT DOCUMENTS

CN   103297178 A   9/2013
CN   105934905 A   9/2016
CN   105991503 A  10/2016

OTHER PUBLICATIONS

3GPP, "3rd Generation Partnership Project; Technical Specification Group Radio Access Network; Study on Downlink Multiuser Superposition Transmission (MUST) for LTE (Release 13)", 3GPP TR 36.859 V13.0.0, Dec. 2015, 1-48.
(Continued)

*Primary Examiner* — Dady Chery
(74) *Attorney, Agent, or Firm* — Murphy, Bilak & Homiller, PLLC

(57) ABSTRACT

In one aspect, a RAN node determines UE candidate sets for MUST scheduling where each set includes near UE and far UE MUST positions. The node orders the UE candidate sets according to a scheduling performance metric for each UE candidate set, evaluated with respect to the entire band. The node resolves MUST pairing conflicts by excluding, from the UE candidate sets, any UE candidate set that includes a UE that (a) is also present in a UE candidate set having a better scheduling performance metric and (b) has an inconsistent MUST position for interference cancellation with
(Continued)

respect to the better UE candidate set, to obtain a reduced set of UE candidate sets. The node performs subband scheduling on each subband, using either MUST or OMA transmission scheduling for each subband. The reduced set is used for MUST scheduling. MUST/OMA subband conflicts may also be resolved.

21 Claims, 16 Drawing Sheets

(51) Int. Cl.
H04B 1/711 (2011.01)
H04B 15/02 (2006.01)
H04W 72/04 (2009.01)
H04B 15/00 (2006.01)

(52) U.S. Cl.
CPC ............ *H04L 5/003* (2013.01); *H04L 5/0091* (2013.01); *H04W 72/0453* (2013.01); *H04W 72/0473* (2013.01); *H04B 15/00* (2013.01); *H04L 5/0057* (2013.01)

(56) References Cited

U.S. PATENT DOCUMENTS

| | | | |
|---|---|---|---|
| 2014/0133334 A1* | 5/2014 | Nagata | H04B 7/0452 370/252 |
| 2015/0312074 A1* | 10/2015 | Zhu | H04L 27/2627 370/329 |
| 2016/0191174 A1* | 6/2016 | Hwang | H04B 15/00 |
| 2016/0337018 A1* | 11/2016 | Hwang | H04L 5/003 |
| 2016/0366003 A1* | 12/2016 | Kwon | H04L 1/0001 |
| 2017/0094668 A1* | 3/2017 | Tsai | H04B 7/0619 |
| 2017/0134150 A1* | 5/2017 | Hwang | H04B 7/0452 |
| 2018/0124708 A1* | 5/2018 | Davydov | H04W 52/143 |
| 2018/0242288 A1* | 8/2018 | Kim | H04L 5/0064 |
| 2018/0254814 A1* | 9/2018 | Park | H04B 7/06 |
| 2018/0331859 A1* | 11/2018 | Kim | H04B 7/0486 |
| 2019/0045460 A1* | 2/2019 | Muruganathan | H04B 7/0482 |

OTHER PUBLICATIONS

Unknown, Author, "Candidate schemes for superposition transmission", Huawei, HiSilicon, 3GPP TSG RAN WG1 meeting 81, R1-152493, Fukuoka, Japan, May 25-29, 2015, 1-11.

Unknown, Author, "Evaluation methodologies for downlink multiuser superposition transmissions", NTT DOCOMO, 3GPP TSG RAN WG1 Meeting #81, R1-153332, Fukuoka, Japan, May 25-29, 2015, 1-7.

Zhao, Lingli, "The Multi User Detection Technology in 3G Mobile Communication System", Shandong Communication Technology, vol. 27, No. 1, Mar. 2007, 1-4.

* cited by examiner

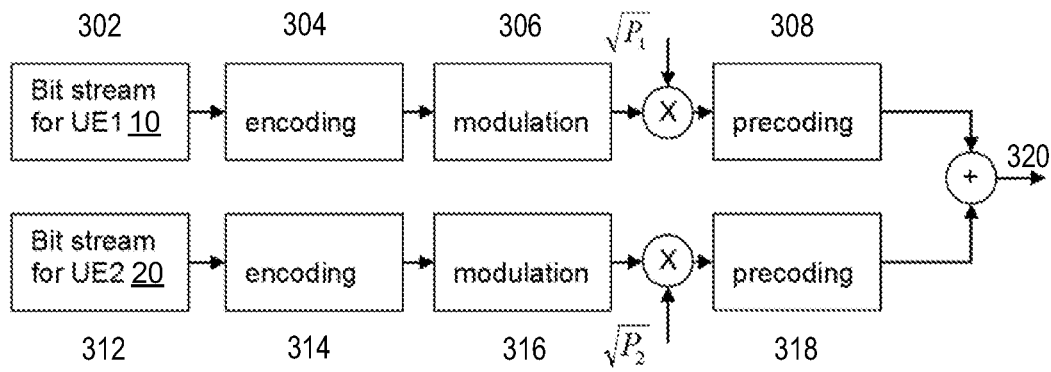
FIG. 3
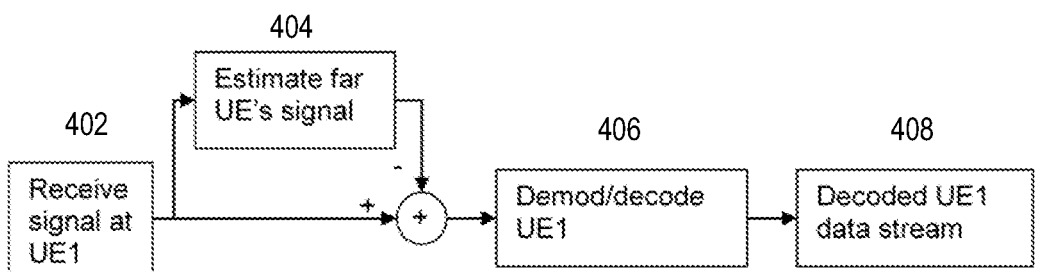
(a) Receiver at the near UE (UE1)
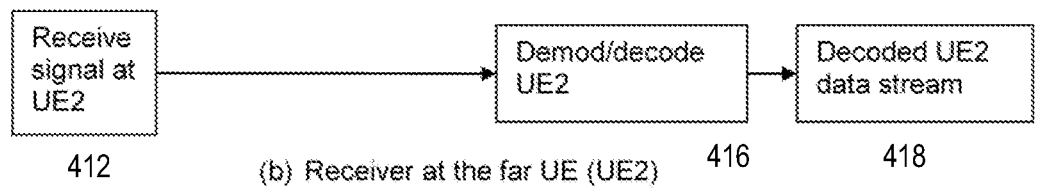
(b) Receiver at the far UE (UE2)
FIG. 4

| Superposed Constellation | Far UE Constellation | Near UE Constellation | Near UE Power Share $\alpha_1$ in dB | Far UE Power Share $\alpha_2$ in dB |
|---|---|---|---|---|
| 16-QAM | QPSK | QPSK | -6.9867 dB | -0.9691 dB |
| 64-QAM | QPSK | 16-QAM | -6.2342 dB | -1.1805 dB |
| 64-QAM | 16-QAM | QPSK | -13.1876 dB | -0.2136 dB |
| 256-QAM | QPSK | 64-QAM | -6.0730 dB | -1.2321 dB |
| 256-QAM | 16-QAM | 16-QAM | -12.2915 dB | -0.2641 dB |
| 256-QAM | 64-QAM | QPSK | -19.2082 dB | -0.0524 dB |

*FIG. 7*

| OMA transmission (UE1) | OMA transmission (UE2) | MUST transmission (UE1 + UE2) | OMA transmission (UE3) | ... |

Subframe k　　　k+1　　　k+2　　　k+3

|  | Subframe k | k+1 | k+2 | k+3 |
|---|---|---|---|---|
| n+2 | OMA transmission (UE1) | MUST transmission (UE1 + UE2) | MUST transmission (UE1 + UE3) | OMA transmission (UE3) |
| n+1 | OMA transmission (UE1) | MUST transmission (UE1 + UE2) | MUST transmission (UE2 + UE3) | MUST transmission (UE1 + UE2) |
| Subband n | MUST transmission (UE2 + UE3) | MUST transmission (UE1 + UE3) | MUST transmission (UE1 + UE3) | OMA transmission (UE3) |

*FIG. 10*

| MUST transmission (UE1 + UE2) | MUST transmission (UE1 + UE2) | MUST transmission (UE1 + UE2) | OMA transmission UE1 | OMA transmission UE1 | OMA transmission UE2 | OMA transmission UE2 |
|---|---|---|---|---|---|---|
| Subband k | k+1 | k+2 | k+3 | k+4 | k+5 | k+6 |

1600

```
┌─────────────────────────────────────────────────────────────────┐
│ DETERMINE A PLURALITY OF UE CANDIDATE SETS FOR MUST SCHEDULING  │
│ IN A BAND COMPRISING A PLURALITY OF SUBBANDS, WHEREIN EACH UE   │
│ CANDIDATE SET COMPRISES A FIRST UE IN A NEAR MUST POSITION AND  │
│ A SECOND UE IN A FAR MUST POSITION                              │
│ 1602                                                            │
└─────────────────────────────────────────────────────────────────┘
                                 │
                                 ▼
┌─────────────────────────────────────────────────────────────────┐
│ ORDER THE PLURALITY OF UE CANDIDATE SETS ACCORDING TO A         │
│ SCHEDULING PERFORMANCE METRIC FOR EACH UE CANDIDATE SET,        │
│ WHEREIN EACH SCHEDULING PERFORMANCE METRIC IS EVALUATED WITH    │
│ RESPECT TO THE ENTIRE BAND                                      │
│ 1604                                                            │
└─────────────────────────────────────────────────────────────────┘
                                 │
                                 ▼
┌─────────────────────────────────────────────────────────────────┐
│ RESOLVE MUST PAIRING CONFLICTS BY EXCLUDING, FROM THE PLURALITY │
│ OF UE CANDIDATE SETS, ANY UE CANDIDATE SET THAT INCLUDES A UE   │
│ THAT (A) IS ALSO PRESENT IN A UE CANDIDATE SET HAVING A BETTER  │
│ SCHEDULING PERFORMANCE METRIC AND (B) HAS AN INCONSISTENT MUST  │
│ POSITION FOR INTERFERENCE CANCELLATION WITH RESPECT TO THE UE   │
│ CANDIDATE SET HAVING THE BETTER SCHEDULING PERFORMANCE METRIC,  │
│ TO OBTAIN A REDUCED SET OF UE CANDIDATE SETS                    │
│ 1606                                                            │
└─────────────────────────────────────────────────────────────────┘
                                 │
                                 ▼
┌─────────────────────────────────────────────────────────────────┐
│ PERFORM SUBBAND SCHEDULING ON EACH SUBBAND OF THE PLURALITY OF  │
│ SUBBANDS, USING EITHER MUST SCHEDULING OR OMA TRANSMISSION      │
│ SCHEDULING, WHEREIN THE REDUCED SET IS USED FOR MUST SCHEDULING │
│ 1608                                                            │
└─────────────────────────────────────────────────────────────────┘
```

*FIG. 16*

| Set # | wideband scheduling metric | Near UE | Far UE | power allocation | Examination order | Note |
|---|---|---|---|---|---|---|
| 1 | 100 | UE1 | UE2 | (0.2, 0.8) | 1 | Best candidate set, automatically retained |
| 2 | 60 | UE1 | UE3 | (0.2, 0.8) | 2 | No conflict with set 1 (the best set), set retained |
| 3 | 30 | UE2 | UE3 | (0.1, 0.9) | 3 | In conflict with set 1 due to UE2 (near-far conflict), set removed |
| 4 | 20 | UE1 | UE4 | (0.3, 0.7) | 4 | In conflict with set 1 due to UE1 (power allocation conflict), set removed |
| 5 | 15 | UE4 | UE2 | (0.2, 0.8) | 5 | No conflict with previously retained sets 1&2, set retained |
| 6 | 10 | UE4 | UE3 | (0.3, 0.7) | 6 | In conflict with set 2 due to UE3 (power allocation conflict), set removed |

*FIG. 18*

HYBRID MULTIBAND AND SUBBAND SCHEDULING IN MULTI-USER SUPERPOSITION TRANSMISSION

TECHNICAL FIELD

The present invention generally relates to wireless communication networks, and particularly relates to multi-user superposition transmission (MUST) scheduling.

BACKGROUND

In LTE up to release 12, only orthogonal multiple access (OMA) is used where user equipments (UEs) are multiplexed in either time, frequency or spatial domain or a combination of time, frequency and spatial domains. Another form of UE data multiplexing under study in LTE release 13 is multi-user superposition transmission (MUST), in which two or more UEs with different path losses to a serving base station are superposed on the same time-frequency and/or spatial resources, such as Orthogonal Frequency Division Multiplexing (OFDM) resource elements. This is realized by assigning different transmit powers to the different UEs. The total power is split among the UEs served in the same time-frequency resources, where the transmit power level allocated to a given UE (or 'power share values') is generally determined by the channel condition (i.e., path loss) experienced by the UEs. For instance, UEs having higher path loss (i.e. UEs far away from the eNodeB, or eNB) can be allocated higher transmit powers while UEs having lower path loss (i.e., UEs near to the eNB) can be allocated lower transmit powers. The total combined transmit power is, however, kept the same.

An example is shown in FIG. 1, where a near UE (UE1) 10 and a far UE (UE2) 20 are present in a cell 40 served by a radio access network node, such as eNB 30. The two UEs 10 and 20 can be superposed at the same time-frequency resource as follows:

$$x = \sqrt{P_1} s_1 + \sqrt{P_2} s_2 \quad \text{eq. (1)}$$

where x is the superposed signal transmitted from the eNB 30, $P_i$ is the allocated transmit power to $UE_i$ (i=1, 2) and $$\sum_i P_i = P,$$

where P is the total transmit power over the resource element. The received signal at UE i is then $$y_i = H_i(\sqrt{P_1} s_1 + \sqrt{P_2} s_2) + v_i \quad \text{eq. (2)}$$

or $$y_i = H_i \sqrt{P}(\sqrt{\alpha_1} s_1 + \sqrt{\alpha_2} s_2) + v_i \quad \text{eq. (3)}$$

where $H_i$ (i=1, 2) is the channel response to $UE_i$, $$\alpha_1 = \frac{P_1}{P} \text{ and } \alpha_2 = \frac{P_2}{P},$$

$v_i$ (i=1, 2) is the receiver noise at $UE_i$.

FIG. 2 shows the received signal power at each of the UEs. UE1 10 is closer to the eNB 30 (i.e. a cell center UE) and thus has a smaller propagation path loss, while UE2 20 is far away from the eNB 30 (i.e. a cell edge UE) and thus has a larger propagation path loss. To reach UE2 20, a higher transmit power is needed than for UE1 10, i.e. $P_2 > P_1$. When $P_1$ is much smaller than $P_2$, UE2 20 is still able to decode its data successfully at the presence of UE1's 10 signal. Since UE1 10 is close to the eNB 30, it would see a strong signal 12 intended for UE2 20. If UE1 10 can estimate the signal 12 $H_1 \sqrt{P_2} s_2$, then it can cancel this estimate from the received signal $y_1$. After the cancellation, UE1 10 would be able to decode its own signal.

General MUST transmitter and receiver diagrams are shown in FIGS. 3 and 4, respectively. For example, FIG. 3 shows a simplified block diagram of a MUST transmitter configured to superpose transmitted symbols for two UEs. As shown in the figure, the information bits 302 corresponding to the near UE1 10 (i.e. the cell-center UE) and those 312 corresponding to the far UE2 20 (i.e. the cell-edge UE) are first separately channel encoded 304, 314. The two sets of channel encoded bits are then jointly modulated 306, 316 and precoded 308, 318 with the appropriate transmit power level settings to produce the MUST signal 320. Generally, a higher transmit power level is allocated to the far UE2 20 and a lower transmit power level is allocated to the near UE1 10. The total transmit power is kept unchanged.

FIG. 4 shows a simplified block diagram of MUST receiver processing for a case with two superposed UEs. Since the two UEs are allocated different power levels, the near UE1 10 can attempt to cancel the interference emanating from the data transmission intended to the far UE2 20. The MUST signal 320 is received at the near UE1 10 and the far UE 20, shown by flow blocks 402, 412. Typically, the far UE2 20 uses a normal receiver and need not even be aware that there is a superposed transmission to a near UE1 10. The interference cancellation for the near UE1 10 can be done in two ways. A first option is that the codeword corresponding to the far UE2 20 is decoded at the near UE1 10 and then reconstructed 404 and cancelled or removed from the received signal. This type of cancellation is referred to as codeword level interference cancellation (CWIC). A second option is that the near UE1 10 makes a symbol-wise hard demodulation decision of the symbols corresponding to the far UE2 20 and then cancels the interference. This type of interference cancellation is referred to as symbol level interference cancellation (SLIC).

Following the steps of interference cancellation, the near UE1 10 then decodes 406 its own codeword(s), to generate a decoded data stream 408. For certain flavors of MUST schemes, a third option is also possible where the near UE1 10 collects its own coded bits (i.e. discards the far UE2 20 coded bits) and then proceeds towards decoding 406 its own codeword(s).

Given that the far UE2 20 is allocated a higher transmit power level than the near UE1 10, the far UE2 20 demodulates and decodes 416 its own codeword without cancelling the interference emanating from the data transmission intended for the near UE1, to generate a decoded data stream 418.

When the base station (BTS), such as eNB 30, has multiple transmit antennas, each of the signals can be precoded before transmission. In this case, the transmitted signal from a base station becomes $$x = \sqrt{P_1} W_1 s_1 + \sqrt{P_2} W_2 s_2 \quad \text{eq. (4)}$$

where $\underline{x}=[x_1, x_2, \ldots, x_{N_{TX}}]^T$ and $x_n (n=1, \ldots, N_{TX})$ is the transmitted signal on the $n^{th}$ antenna, $N_{TX}$ is the number of Transmit antennas; $\underline{W}_i (i=1, 2)$ is a $N_{TX} \times 1$ precoding vector applied to the signal $s_i$. If the UEs also have multiple receive antennas, the received signal at $UE_i$ becomes:

$$\underline{y}_i = \underline{H}_i \cdot \underline{x} + \underline{v}_i = \underline{H}_i \cdot (\sqrt{P_1}\underline{W}_1 s_1 + \sqrt{P_2}\underline{W}_2 s_2) + \underline{v}_i \qquad \text{eq. (5)}$$

where $\underline{y}_i = [y_i(1), y_i(2), \ldots, y_i(N_i^{RX})]^T$, $y_i(k)$ is the received signal on antenna k of $UE_i$, $N_i^{RX}$ is the number of receive antennas of $UE_i$; $\underline{H}_i$ is a $N_i^{RX} \times N_{TX}$ channel matrix, and $\underline{v}_i$ is a $N_i^{RX} \times 1$ noise vector. Similar to the single antenna case, if UE1 can, by using the channel estimate $\underline{\hat{H}}_1$ and information about $\sqrt{P_2}\underline{W}_2$, estimate the transmitted signal $\sqrt{P_2}\underline{W}_2 s_2$, then UE1 is able to decode its own signal after subtracting $\underline{\hat{H}}_1 \cdot \sqrt{P_2}\underline{W}_2 s_2$ from the received signal $\underline{y}_1 = \underline{H}_1 \cdot (\sqrt{P_1}\underline{W}_1 s_1 + \sqrt{P_2}\underline{W}_2 s_2) + \underline{v}_1$.

Three variants of MUST schemes are being considered in the Release 13 study item on MUST. Brief descriptions of these schemes are given below.

Non-Orthogonal Multiple Access (NOMA)

In the NOMA scheme, the information bits corresponding to the far UE2 20 and the near UE1 10 are independently encoded and modulated. The symbol $s_1$ is drawn from a near UE1 constellation, and the symbol s2 is drawn from a far UE2 constellation. Then the superposed symbol x in the NOMA scheme has a superposed constellation (super-constellation). An example of the superposed NOMA constellation for the case where both the near UE1 10 and far UE2 20 employ QPSK constellation is shown in FIG. 5. In this case, the superposed constellation is similar to a 16 QAM constellation.

Semi-Orthogonal Multiple Access (SOMA)

SOMA differs from the NOMA scheme in that SOMA uses Gray mapped superposed constellation. The coded modulation symbols of near UE1 10 and far UE2 20 are jointly Gray mapped and then added together as in eq. (1). An example of the superposed SOMA constellation for the case where both the near UE1 10 and far UE2 20 employ QPSK constellation is shown in FIG. 6, where $\alpha = \alpha_1$.

Rate-Adaptive Constellation Expansion Multiple Access (REMA)

REMA is similar to SOMA with one restriction that the resulting superposed constellation should be a regular QAM constellation having equal horizontal and vertical spacing between constellation points (as is used in, e.g., LTE). In REMA, the bits with the higher bit-level capacities are allocated for the far UE2 20 and the bits with the lower bit-level capacities are allocated for the near UE1 10. In addition, the power sharing parameter should also be set appropriately so that the resulting superposed constellation is a regular QAM constellation. There are six different ways (shown in the table of FIG. 7) of realizing REMA that has LTE standard constellations as superposed constellations. In an example, FIG. 8 illustrates an example of 16-QAM superposed REMA constellation.

Wideband Scheduling

With wideband scheduling, an eNB may schedule the whole available frequency resources (i.e. the whole frequency band) to either a UE using OMA transmission or multiple (e.g. two) UEs, each on the whole frequency band, using MUST transmission in each subframe. The scheme selected depends on whether or not a suitable UE pair can be found for MUST scheduling based on some scheduling metric, e.g. proportional fairness (PF) metric. If there is a suitable pair of UEs found in a subframe, MUST transmission may be scheduled. Otherwise, OMA transmission may be scheduled. An example is shown in FIG. 9, where a suitable pair (UE1 and UE2) are found and MUST is scheduled for these two UEs in subframe (k+2). In the remaining subframes, OMA transmission is scheduled.

MUST transmission is scheduled if it gives higher average performance than OMA transmission, according to an adopted scheduling metric. A candidate user set for MUST transmission (also referred to as a UE candidate set) includes two or more UEs to be scheduled on the same resource. For each candidate user set for MUST transmission, the candidate transmission power set is searched and the transmission power allocation that gives the best performance is selected. Then, the candidate user set for MUST with the best performance is compared with the OMA user with the best performance, to determine what kind of scheme to use for scheduling. For wideband, a PF scheduling performance metric for MUST transmission is calculated as $$\sum_{i \in U} \frac{t_i(p)}{T_i^a},$$

where U is the candidate user set for MUST transmission, $T_i$ is the historic average throughput for $UE_i$, $t_i(p)$ is the estimated throughput of $UE_i$ when it is scheduled in the whole frequency band in the examined subframe based on a channel quality estimation of the UE being co-scheduled with other UEs in the candidate set, P denotes the allocated power set, and a is a PF coefficient used to balance data throughputs between cell edge and cell center UEs.

$$\sum_{i \in U} \frac{t_i(p)}{T_i^a}$$

will be referred to as a wideband PF scheduling metric for MUST.

In case of OMA scheduling, the wideband PF scheduling metric for $UE_i$ is calculated as $$\frac{t_i}{T_i^a},$$

where $t_i$ is the estimated throughput of $UE_i$ when it is the only UE scheduled in the whole frequency band in a subframe.

Subband Scheduling

The frequency band can be divided into multiple non-overlapping subbands, each subband using different frequencies. With subband scheduling, an eNB may schedule either a UE using OMA transmission or multiple (e.g. two) UEs using MUST transmission in each subband in a subframe, depending on whether or not a suitable UE pair can be found for MUST scheduling in that subband and subframe. This may be based on some scheduling metric, such as PF. If there is a suitable pair of UEs found in that subband and subframe, MUST transmission may be scheduled, otherwise OMA transmission may be scheduled. As a subband PF metric, the performance for MUST transmission in a specific subband is calculated as $$\sum_{i \in U} \frac{t_i(p, f)}{T_i^\alpha},$$

where U is the candidate user set for MUST transmission, $T_i$ is the historic average throughput for $UE_i$, $t_i(p,f)$ is the estimated throughput if it is scheduled in subband f in the examined subframe, P denotes the allocated power sets, and a is the PF coefficient.

In the case of OMA scheduling in a subband, the subband PF scheduling metric for $UE_i$ is calculated as $$\frac{t_i(f)}{T_i^\alpha},$$

where $t_i(f)$ is the estimated throughput of $UE_i$ when it is the only UE scheduled in subband f in the examined subframe.

In order to limit the receiver complexity, it is not desirable to have a UE perform interference cancellation in some subband(s) while not in other subband(s). For example, a UE cannot act as both a far UE and a near UE at the same time. Besides, allocating different transmission power to a UE for different subbands is not allowed. This implies the following restrictions.

As one restriction, once a UE is scheduled using MUST transmission and performs interference cancellation in one subband, it has to do so in all scheduled subband(s). The UE can be paired with multiple different UEs, but the power allocation must be the same over all scheduled subbands.

As another restriction, once a UE is scheduled using MUST transmission and does not perform interference cancellation in one subband (i.e. the UE is scheduled as a "far" UE in the subband), it has to be a "far" UE in all scheduled subband(s). While the UE can be paired with multiple different UEs, the power allocation must be the same over all scheduled subbands.

As a third restriction, once a UE is scheduled using OMA transmission in one subband, it has to be scheduled with OMA transmission in all scheduled subband(s), and with the same power allocation.

An example is shown in FIG. 10, with the restrictions described above. In subframe k and (k+3), both OMA transmission and MUST transmission are scheduled in different subbands. In subframe (k+1) and (k+2), MUST transmission is scheduled in all subbands. In subframe k+1, UE1 is paired with UE2 in subbands n+1 and n+2 and with UE3 in subband n. Similarly, in subframe k+2, UE3 is paired with UE1 in subbands n and n+2 but with UE2 in subband n+1. So generally, a UE may be paired with different UEs in different subbands.

The subband scheduling procedure is briefly described as such. In each subband and for each candidate user set for MUST transmission, the candidate transmission power set is searched and the transmission power allocation that gives the best performance is selected. Then, the candidate user set with the best performance is compared with the OMA user with the best performance to determine what kind of scheme to be scheduled in that subband.

For example, if there are three users UE1, UE2 and UE3 waiting to be scheduled, the candidate user sets for MUST transmission include {UE1, UE2}, {UE1, UE3}, and {UE2, UE3}. For a given candidate user set {UEi, UEj} (i,j=1, 2, 3), the transmission power sets are the possible power allocations between the two UEs, for example, {(0.9, 0.1), (0.8, 0.2), (0.7, 0.2), (0.6, 0.4), (0.4, 0.6), (0.3, 0.7), (0.2, 0.8), (0.1, 0.9)}.

When this is finished, a UE may be allocated on multiple subbands and an associated transmission power on each subband. Transmission power allocation is optimized for each subband, which however may be different from subband to subband for the same UE. In addition, the UE may be paired with another UE in one subband using MUST, while not paired with any UE in another subband using OMA. Furthermore, the UE may be treated as a near UE in one subband (in which case, interference cancellation is needed), while treated as a far UE in another subband (in which case, no interference cancellation is required) for MUST transmission. Therefore, whether there exists a paired UE or not (MUST or OMA), and whether the interference cancellation is needed or not, may be different in the scheduled subbands for a certain UE. That is, a conflict may exist. The conflict occurs when the different types of scheduling of a UE (i.e. any two of MUST as a near UE, MUST as a far UE and OMA) occur at the same time, e.g. in the same subframe. For example, as shown in FIG. 11, UE #3 is required to cancel the interference 1102 from UE #2 in subband #4, while not required 1104 in subband #5, #6, and #8. UE #3 is scheduled for OMA transmission 1106 in subband #5, and UE #1 is scheduled for OMA transmission in subband #7. Further steps are needed to meet the restrictions mentioned above, such as subband releasing.

Step 1: For a UE of interest, if the number of subbands requiring interference cancellation is the largest, those subbands are retained as the scheduled subbands requiring interference cancellation and other subbands for this UE are released 1108 (Step 2). For a UE of interest, if the number of subbands not requiring interference cancellation is the largest, those subbands are retained as the scheduled subbands not requiring interference cancellation and other subbands for this UE are released 1108. For a UE of interest, if the number of subbands not having the paired UEs is the largest, those subbands are retained as the scheduled subbands not having the paired UEs, i.e., OMA subbands, and other subbands for this UE are released 1108.

Step 3: Perform rescheduling 1110 and repeat steps 1-2 for the released subband(s), until no subband is to be released. Note that in each round of re-scheduling, the best UE for each of the released subbands has to be re-searched based on the scheduling metric, or the sorting of UEs needs to be performed based on the scheduling metric in the first round of scheduling for all the subbands, instead of just finding the best. This implies higher computation costs.

Step 4: Align the transmission power allocation for each UE in the scheduled subbands 1112. This requires one more search of the candidate transmission power set with the restriction that the same power should be allocated for different scheduled subbands for a UE.

Due to the need for subband release and the multiple iterations of re-scheduling, together with the conflict resolving, the subband scheduling with MUST may bring a much higher complexity than the wideband scheduling and the subband scheduling with OMA. With MUST, the complexity increase with wideband scheduling is moderate compared to a wideband scheduling with only OMA transmission. However, the performance improvement may be impacted. It has been shown that MUST with wideband scheduling could provide some gain over OMA with wideband scheduling at high load, but the gain over OMA with subband scheduling is much smaller, or even a loss. In other words, OMA with subband scheduling performs better than OMA with wideband scheduling. Therefore, to further improve system performance, MUST scheduling over subband is needed. On the other hand, MUST with subband scheduling has a much higher complexity compared to subband scheduling with only OMA transmission. This is especially a problem considering that MUST provides a gain at high load, where there are more users in the system to be scheduled. Furthermore, the subband scheduling that has been proposed may lead to sub-optimal performance, as the subband releasing is purely based on counting different types of subband scheduling. This does not take the actual performance into account, i.e., it is not guaranteed that the proposed scheduling will always provide a gain over the purely OMA subband scheduling. Besides, per user based subband release may lead to undesired behavior. For instance, as illustrated in FIG. 12, subband k to k+2 will be retained. Subband k+3 to k+6 will be released, as for both UE1 and UE2, the number of subbands having the paired UEs is the largest. However, if we treat UE1 and UE2 jointly, or specifically user pair based treatment, subband k+3 to k+6 will then be retained while subband k to k+2 will instead be released. The latter is actually what is desired, i.e., to retain the type of subband (MUST or OMA) with the largest number of scheduled subbands.

SUMMARY

Embodiments of the present invention provide the ability to exploit the potential of subband scheduling while limiting the complexity increase when using MUST.

According to some embodiments, a method in a radio access network node of a wireless communication network includes determining a plurality of UE candidate sets for MUST scheduling in a band comprising a plurality of subbands, where each UE candidate set comprises a first UE in a near MUST position and a second UE in a far MUST position. The first UE needs to perform interference cancellation to remove the received signals intended to the second UE. The method includes ordering the plurality of UE candidate sets according to a scheduling performance metric for each UE candidate set, where each scheduling performance metric is evaluated with respect to the entire band. The method also includes resolving MUST pairing conflicts by excluding, from the plurality of UE candidate sets, any UE candidate set that includes a UE that (a) is also present in a UE candidate set having a better scheduling performance metric and (b) has an inconsistent MUST position for interference cancellation with respect to the UE candidate set having the better scheduling performance metric, to obtain a reduced set of UE candidate sets. The method further includes performing subband scheduling on each subband of the plurality of subbands, using either MUST scheduling or OMA transmission scheduling, and wherein the reduced set of UE candidate sets is used for MUST scheduling.

According to some embodiments, a radio access network node of a wireless communication network includes a transceiver circuit configured to send and receive wireless signals and a processing circuit operatively connected to the transceiver circuit. The processing circuit is configured to determine a plurality of UE candidate sets for MUST scheduling in a band comprising a plurality of subbands, where each UE candidate set comprises a first UE in a near MUST position and a second UE in a far MUST position. The processing circuit is configured to order the plurality of UE candidate sets according to a scheduling performance metric for each UE candidate set, where each scheduling performance metric is evaluated with respect to the entire band. The processing circuit is also configured to resolve MUST pairing conflicts by excluding, from the plurality of UE candidate sets, any UE candidate set that includes a UE that (a) is also present in a UE candidate set having a better scheduling performance metric and (b) has an inconsistent MUST position for interference cancellation with respect to the UE candidate set having the better scheduling performance metric, to obtain a reduced set of UE candidate sets. The processing circuit is configured to perform subband scheduling on each subband of the plurality of subbands, using either MUST scheduling or OMA transmission scheduling, and wherein the reduced set of UE candidate sets is used for MUST scheduling.

According to some embodiments, a method, in a wireless terminal of a wireless communication network that is to be scheduled for transmission in a band comprising a plurality of subbands, includes reporting subband channel information corresponding to MUST and OMA transmission scenarios for each of a plurality of subbands. The method also includes selectively reporting wideband channel information corresponding to all of the plurality of subbands, in response to configuration information received from a base station in response to a determination by the base station that the wireless terminal may occupy a MUST position of a far UE.

The methods may also be implemented by network nodes, radio access network nodes, wireless devices, apparatus, computer readable medium, computer program products and functional implementations.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 3 illustrates a block diagram of a MUST transmitter at a base station.

FIG. 4 illustrates block diagrams of receiver structures at the near and far UEs.

FIG. 7 illustrates a table of REMA superposed constellations.

FIG. 10 illustrates a subband scheduling diagram.

FIG. 16 is a flowchart illustrating an example scheduling method, according to some embodiments.

FIG. 18 illustrates a table of sorted UE candidate sets, according to some embodiments.

DETAILED DESCRIPTION

Figure 1:
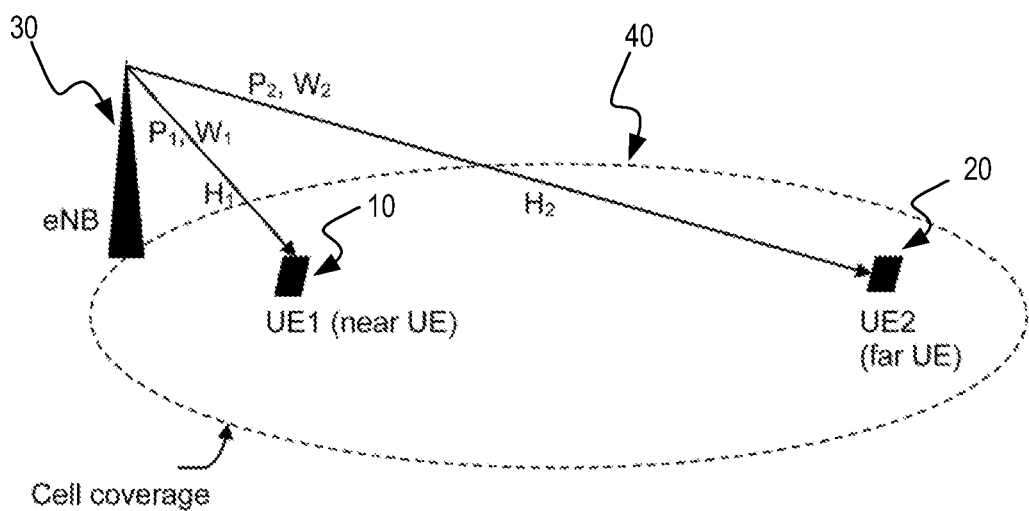
FIG. 1 is a diagram illustrating near and far UEs for MUST pairing.
Figure 2:
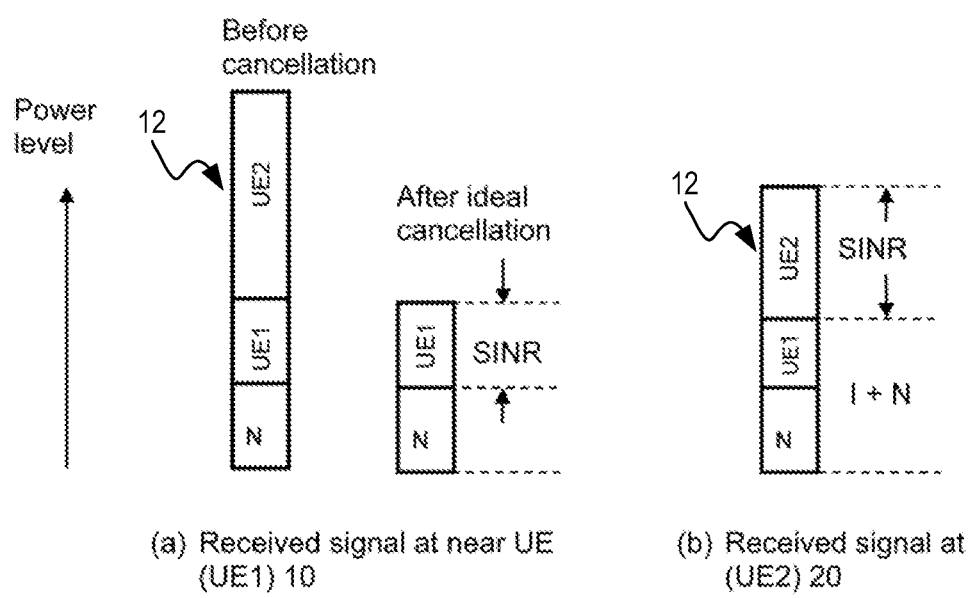
FIG. 2 is a diagram illustrating a signal received at near and far UEs in MUST transmission.
Figure 5:
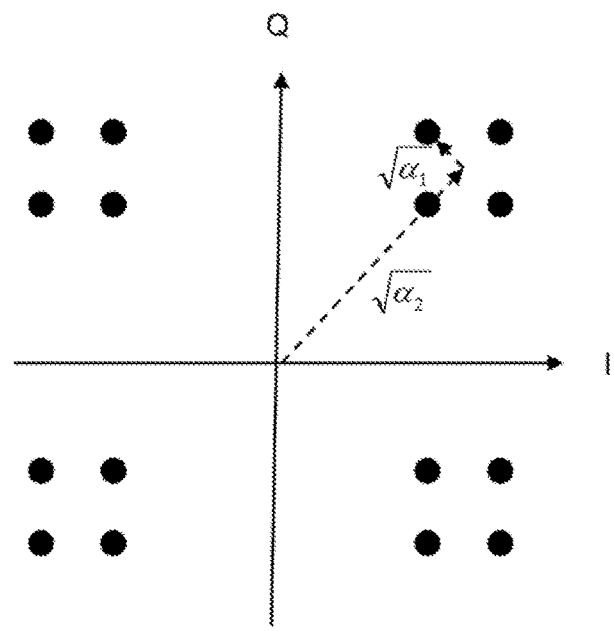
FIG. 5 is a diagram illustrating an example of a superposed constellation in NOMA transmission, where QPSK is used in both near and far UEs.
Figure 6:
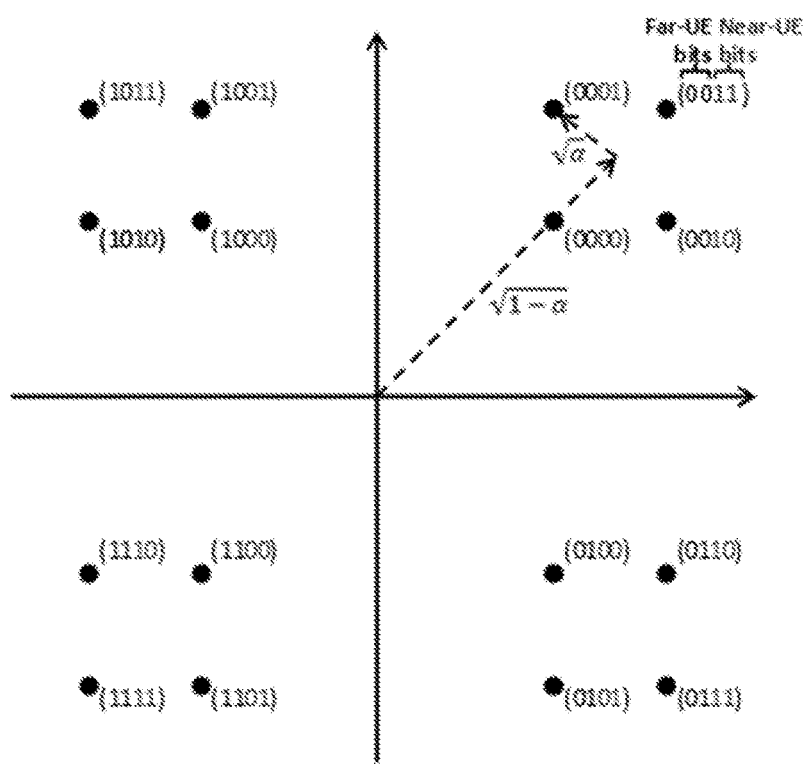
FIG. 6 illustrates an example of superposed SOMA constellation.
Figures 8, 9:
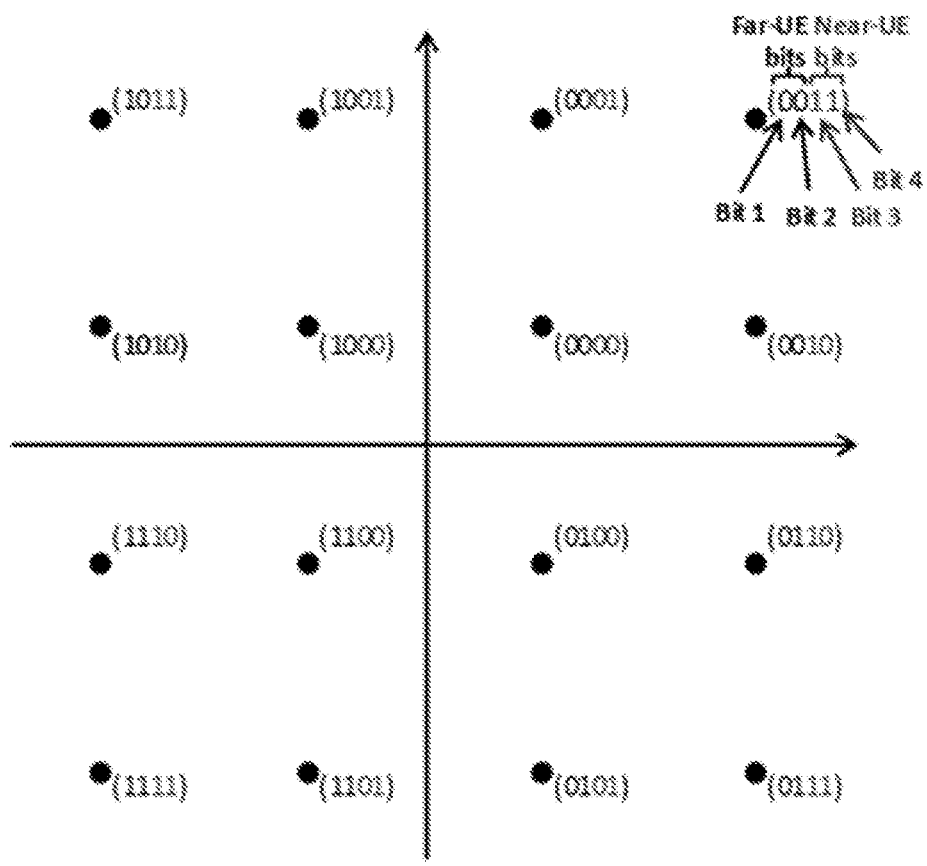
FIG. 8 illustrates an example of 16-QAM superposed REMA constellation.
FIG. 9 illustrates a wideband scheduling diagram.
Figures 11, 12:
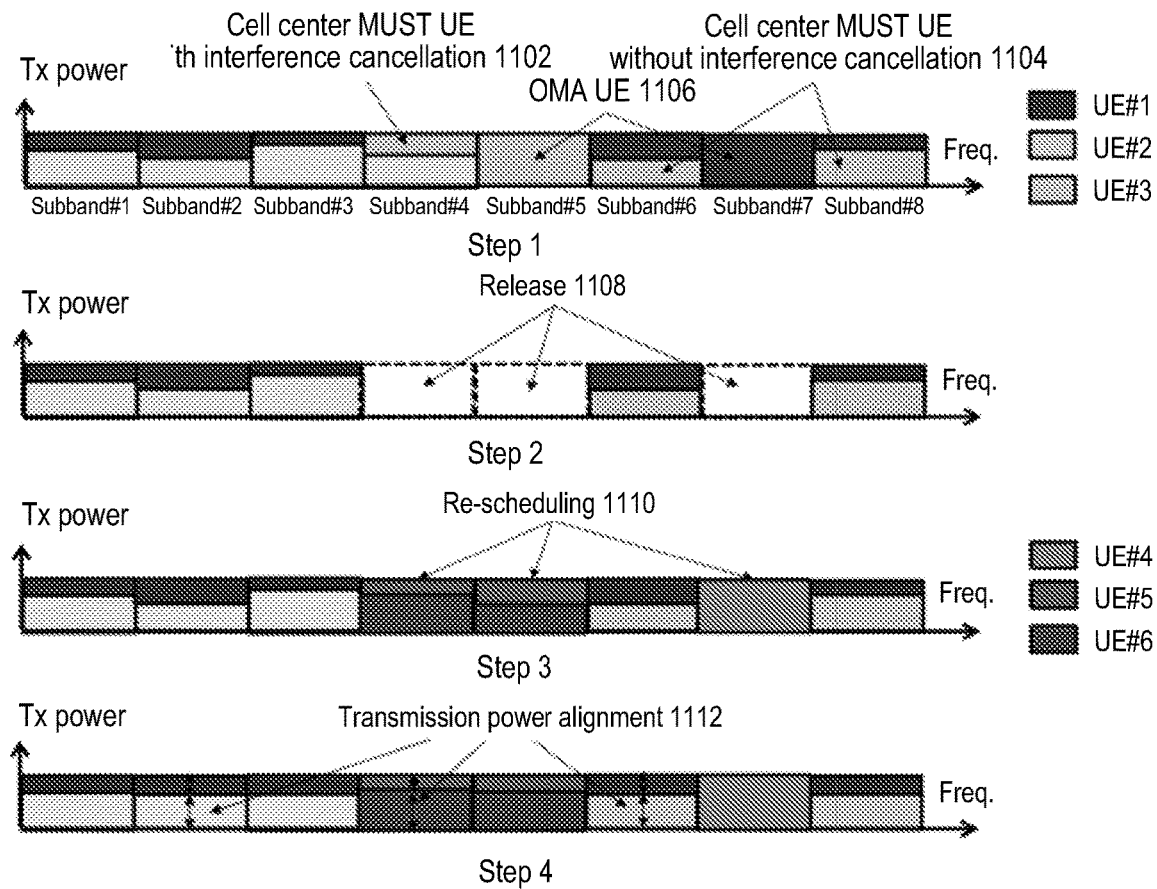
FIG. 11 illustrates an example of a subband scheduling procedure.
FIG. 12 is a scheduling diagram illustrating a problem with per user based subband release.

Subband scheduling increases in complexity because of the occurrence of subband scheduling conflicts. There may be three types of possible conflicts. A first type of conflict occurs when a UE is scheduled as the near UE in one subband but scheduled as the far UE in another subband. A second type of conflict occurs when a UE is scheduled with one transmission power allocation in one subband but a different transmission power allocation in another subband. A third type of conflict occurs when a is UE scheduled with OMA transmission scheduling in one subband but then is scheduled with MUST scheduling in another subband.

It is recognized herein that optimizing conflict resolution is an important aspect in limiting this increase in complexity. An advantage of some embodiments of the invention is that the first and second types of conflicts may be resolved based on a (wideband) scheduling performance metric, before the subband scheduling. The scheduling itself is still subband based, but the interaction between conflict resolution and scheduling can be reduced or avoided, removing the need for repeated rescheduling and conflict resolution. At the same time, the benefit of subband scheduling is retained. As a conflict implies adoption of only one of the MUST transmission schemes over all the scheduled subbands, i.e. a UE can only be either a near user or a far user over all the scheduled subbands, the conflict resolution for the first and second types of conflicts based on a (wideband) scheduling performance metric can provide sufficient performance, while limiting any impact on the benefits of subband scheduling. Here, wideband means the entire band that is available or at least the entire band that encompasses the subbands.

A third type of conflict may be resolved by aggregating subband scheduling performance metrics for OMA and MUST over the subbands that contain the subbands in conflict into a total scheduling performance metric and selecting the scheme with the best total scheduling performance metric.

Note that various scheduling performance metrics are described herein, whether it is a scheduling performance metric (e.g., overall performance for the entire wideband), a best wideband scheduling performance metric that a certain transmit power allocation gives a particular UE candidate set, a subband-specific performance scheduling metric, or a total scheduling performance metric (e.g., performance when scheduling all subbands in conflict with MUST or OMA). Different calculations, values or observations may be made to determine any of these scheduling performance metrics. The PF metric described above is one example of such a metric. However, regardless of the exact calculation or value used, a chosen scheduling performance metric serves as a basis for comparison to determine the better choice for scheduling, The goal of a comparison, or what makes a particular scheduling configuration a better choice (e.g., better performance because is leads to greater efficiency, greater throughput, more efficient resource use, more efficient power use, less conflict or no conflict) is reflected in the scheduling performance metric that is chosen and how such a metric is observed or calculated.

Figure 15:
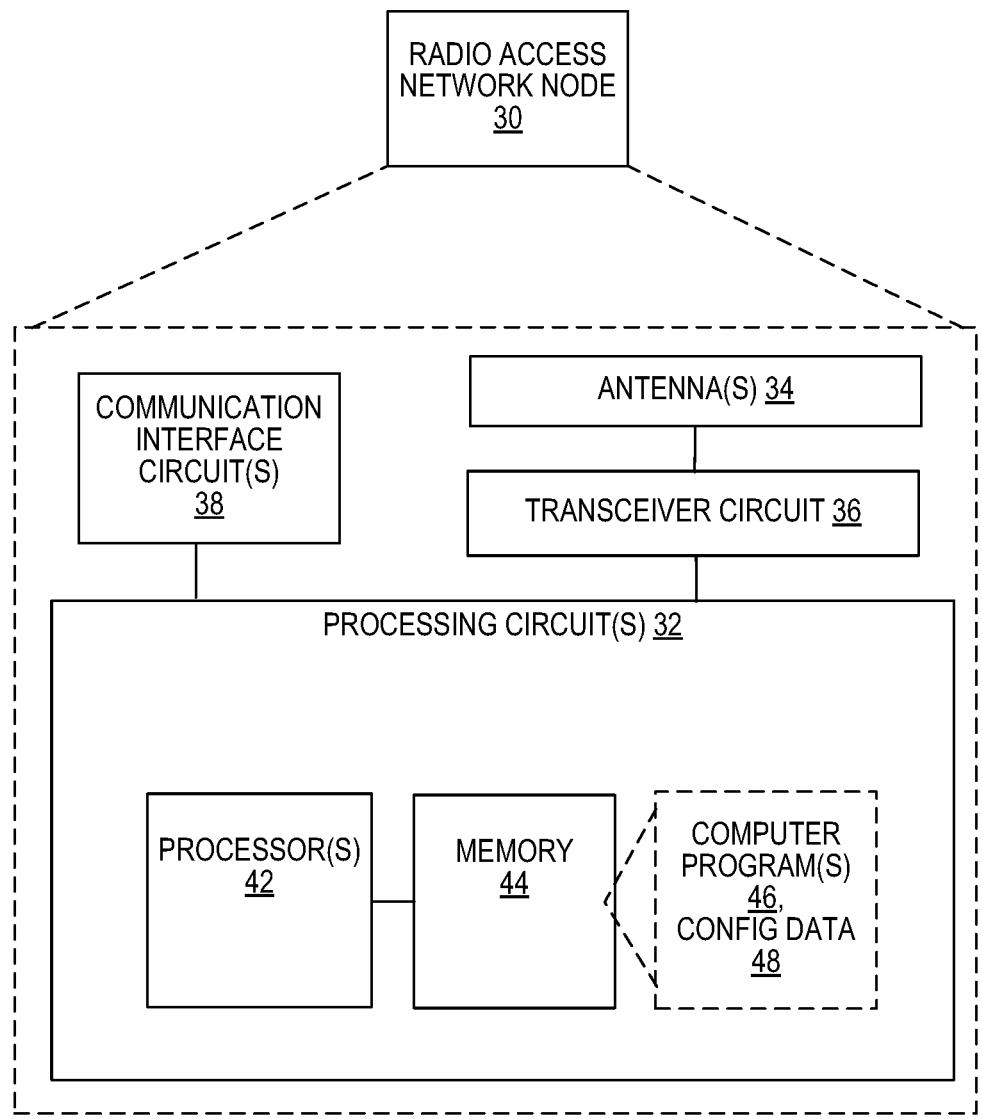
FIG. 15 illustrates a block diagram of a radio access network node configured to perform scheduling, according to some embodiments.

FIG. 15 illustrates a diagram of a radio access network node 30, according to some embodiments, that may be used to implement the techniques described herein. The network node 30 provides an air interface to wireless devices, e.g., an LTE air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3 GPP cellular standards, GSM, GPRS, WCDMA, HSDPA, LTE and LTE-Advanced, or according to any other radio access technology. The network node 30 may also include a communication interface circuit 38 for communicating with nodes in the core network, other peer radio nodes, and/or other types of nodes in the network. The network node 30 may be, for example, a base station or an eNodeB.

The network node 30 also includes one or more processing circuits 32 that are operatively associated with the communication interface circuit 38 and transceiver circuit 36. The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core.

The memory 44, in some embodiments, stores one or more computer programs 46 and, optionally, configuration data 48. The processor(s) 42 of the processing circuit 32 may execute the computer program 46 stored in the memory 44 that configures the processor(s) 42 to determine a plurality of UE candidate sets for MUST scheduling in a band comprising a plurality of subbands, where each UE candidate set comprises a first UE in a near MUST position and a second UE in a far MUST position. The UE candidate sets evaluated in an initial step may contain every combination of UEs, e.g., candidate sets are evaluated for UE1 paired with UE2, UE3, UE4, . . . , etc., and UE2 paired with UE3, UE4, . . . , etc. The processing circuit 32 is configured to order the plurality of UE candidate sets according to a scheduling performance metric for each UE candidate set, where each scheduling performance metric is evaluated with respect to the entire band. The processing circuit 32 is also configured to resolve MUST pairing conflicts by excluding, from the plurality of UE candidate sets, any UE candidate set that includes a UE that (a) is also present in a UE candidate set having a better scheduling performance metric and (b) has an inconsistent MUST position for interference cancellation with respect to the UE candidate set having the better scheduling performance metric, to obtain a reduced set of UE candidate sets. The processing circuit 32 is configured to perform subband scheduling on each subband of the plurality of subbands, using either MUST scheduling or OMA transmission scheduling, and wherein the reduced set of UE candidate sets is used for MUST scheduling.

In some embodiments, the processing circuit 32 is configured to perform a method 1600 for scheduling. For example, FIG. 16 illustrates a method 1600 that includes determining a plurality of UE candidate sets for MUST scheduling in a band comprising a plurality of subbands, where each UE candidate set comprises a first UE in a near MUST position and a second UE in a far MUST position (block 1602). The first UE needs to perform interference cancellation to remove the received signals intended to the second UE. Determining a plurality of UE candidate sets may include identifying, for each UE candidate set, a transmit power allocation providing a best wideband scheduling performance metric for the respective UE candidate set among a plurality of possible transmit power allocations. The best wideband scheduling performance metric is used to determine the scheduling performance metric for the respective UE candidate set.

The method 1600 includes ordering the plurality of UE candidate sets according to a scheduling performance metric for each UE candidate set, where each scheduling performance metric is evaluated with respect to the entire band (block 1604). The scheduling performance metric may be based on channel information under a particular transmit power allocation (i.e. what modulation and coding rate can be allocated to a UE in the subframe). This may involve the instantaneous data rate and also the historic data rate of the UE.

The method 1600 also includes resolving MUST pairing conflicts by excluding, from the plurality of UE candidate sets, any UE candidate set that includes a UE that (a) is also present in a UE candidate set having a better scheduling performance metric and (b) has an inconsistent MUST position for interference cancellation with respect to the UE candidate set having the better scheduling performance, to obtain a reduced set of UE candidate sets (block 1606). The resolving may include excluding, from the plurality of UE candidate sets, any UE candidate set that includes a UE that (c) is also present in a UE candidate set having a better scheduling performance metric and (d) has a different transmit power allocation with respect to the UE candidate set having the better scheduling performance metric.

In some cases, the method 1600 includes identifying, from among the plurality of UE candidate sets, any UE candidate set that includes a UE that (c) is also present in the UE candidate set having a better scheduling performance metric and (d) has a different transmit power allocation with respect to a UE candidate set having the better scheduling performance metric, and resetting the transmit power allocation for the identified UE candidate set to match the transmit power allocation in the UE candidate set having the better scheduling performance metric. The method 1600 may comprise one or both of the described excluding of UE candidate sets which are in conflict and the setting of the transmit power allocation for the identified UE candidate set.

The method 1600 further includes performing subband scheduling on each subband of the plurality of subbands, using either MUST scheduling or OMA transmission scheduling (block 1608). The reduced set of UE candidate sets is used for MUST scheduling. Performing subband scheduling on each subband of the plurality of subbands (1608) may include, for each of one or more of the subbands: performing a tentative scheduling on the subband, using OMA scheduling; performing a tentative scheduling on the subband, using MUST scheduling; selecting MUST scheduling or OMA scheduling for the subband, based on which provides a better scheduling performance metric for the subband; and scheduling the subband according to said selecting. The use of MUST scheduling or OMA transmission scheduling for each subband may be selected based on a subband-specific scheduling performance metric for the subband.

The method 1600 may include identifying scheduling conflicts in which any given UE is scheduled for MUST in one subband and for OMA transmission in another subband, and resolving the scheduling conflicts. The resolving may include determining a total scheduling performance metric for using only MUST scheduling in the subbands that are affected by the identified scheduling conflicts, determining a total scheduling performance metric for using only OMA transmission scheduling in the subbands that are affected by the identified scheduling conflicts and rescheduling UEs in the subbands that are affected by the identified scheduling conflicts using either only MUST scheduling or only OMA transmission scheduling in response to a comparison of the total scheduling performance metrics.

Figure 17:
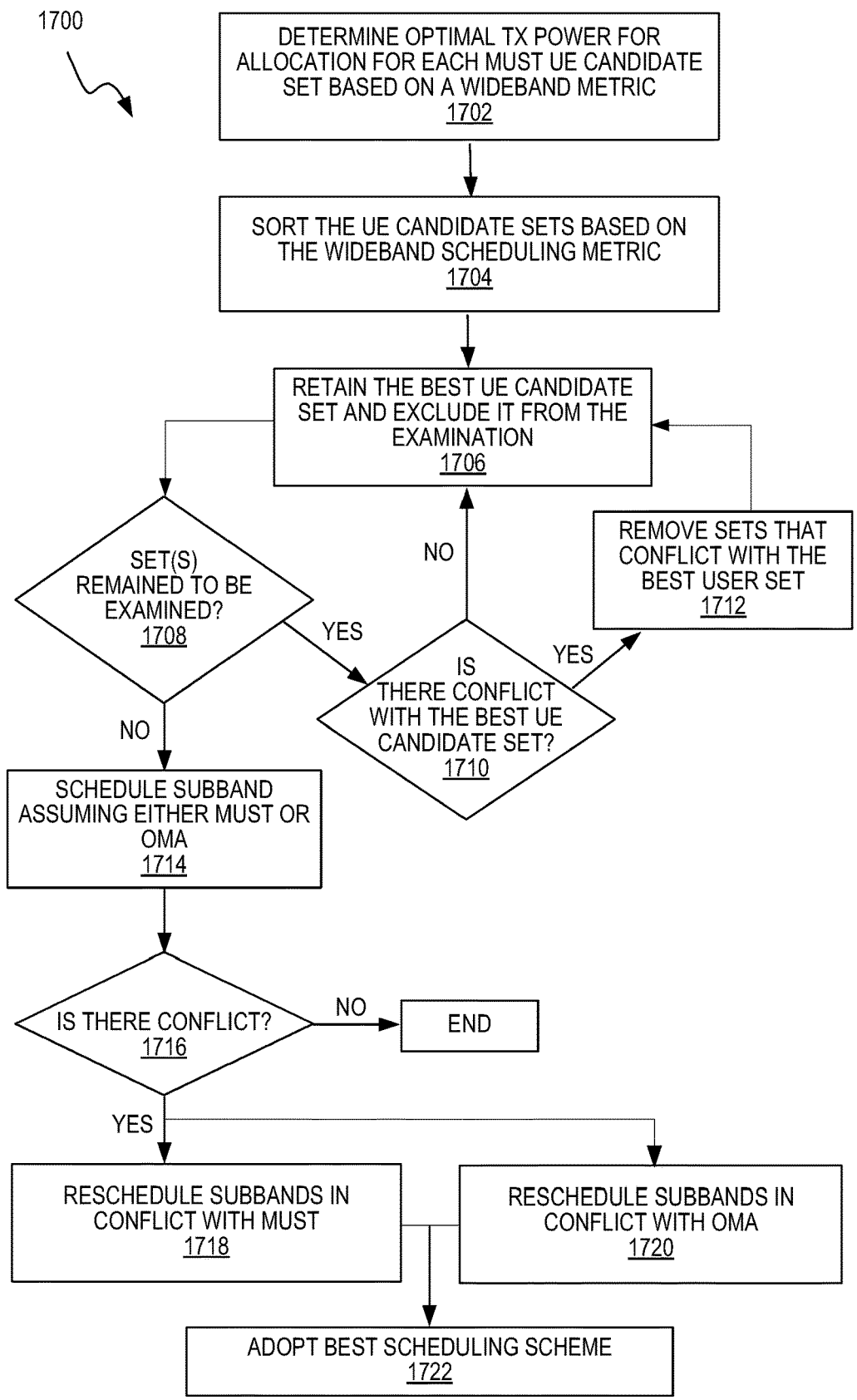
FIG. 17 is another flowchart illustrating an example scheduling method, according to some embodiments.

FIG. 17 illustrates an algorithm 1700 for scheduling to avoid conflicts, according to some embodiments. An optimal transmission power allocation is determined for each UE candidate set based on a wideband metric (block 1702). A first type of conflict is to be addressed at this earlier stage. The first type of conflict would include when a UE is paired with one UE and requires interference cancellation, while at the same time being paired with another UE, but not requiring interference cancellation. For example, the UE candidate sets are sorted based on the wideband scheduling metric (block 1704), using the respective optimal transmission power allocation. In an example, four UEs are considered (UE1 to UE4), and UE candidate sets 1-6 are sorted based on a wideband scheduling metric, as shown in the table of FIG. 18.

The best UE candidate set is retained (block 1704) and excluded from examination. This may be the UE candidate set with the largest wideband scheduling metric value. UE candidate sets are then excluded or removed from the list of active UEs so that conflict will not occur for UEs in the best UE candidate set. If there are UE candidate sets remaining to be examined (block 1708), it is determined if there is still conflict with the remaining best UE candidate sets retained during the previous examination (block 1710). Conflicting UE candidate sets are removed (block 1712). A UE candidate set may be considered as conflicting if scheduled with interference cancellation in a subband and no interference cancellation in another subband. This pre-conflict resolving for candidate MUST user sets makes the subsequent subband scheduling easier as one of the conflicts (scheduled with interference cancellation in some subbands and no interference cancellation in some other subbands) is mitigated. Thus, a UE candidate set is removed if conflicting with the best UE candidate set determined in block 1706, i.e. contains a UE required to act as both a near UE or a far UE, and/or for which transmission power allocations are not compatible. These steps are repeated until no UE candidate sets remain after excluding the conflict resolved UE candidate sets.

In the example table of FIG. 18, UE candidate set 2 has no conflict with set 1 (the best UE candidate set). Therefore, UE candidate set 2 is retained. However, as for UE candidate set 3, there is a near-far UE conflict due to UE2 of UE candidate set 3. This set is removed. There are still UE candidate sets remaining to be examined. For example, UE candidate set 4 has a power allocation conflict with the best set due to UE1. UE candidate set 4 is removed. This examination continues until all sets are examined. Each set will be checked against the retained sets (not just the best set) for conflicts. After the examination stage, UE candidate sets 1, 2 and 5 remain in this example. UE candidate set 6 was removed due to a power allocation conflict regarding UE3.

Thus, prior to subband scheduling, the possible number of UE candidate sets is reduced to only those UE candidate sets which do not have a MUST conflict (e.g. due to near/far conflict and/or transmission power allocation conflict). This reduction in the number of UE candidate sets is based on a wideband (i.e. all or a plurality of subbands) scheduling performance metric, even though the actual scheduling of UE transmissions will be carried out as subband scheduling (i.e. only one subband, which has a smaller frequency range than the wideband scheduling performance metric).

Tentative subband scheduling is then performed for each subband assuming MUST and assuming OMA transmission (block 1714). The tentative scheduling, assuming MUST and separately assuming OMA transmission for each subband, allows for a comparison and evaluation of the overall scheduling performance, and is not the basis for a transmission until further conflict checks have been made. The actual scheduling of UEs is then performed using either MUST or OMA. The transmission scheme (MUST or OMA) with the best subband scheduling metric is kept. If MUST scheduling is kept for the subband, the best UE candidate set may be kept. If OMA transmission scheduling is kept, the UE may be kept. This may include subband scheduling performed assuming MUST transmission with the reduced set of UE candidate sets obtained from earlier steps. MUST subband scheduling may also be performed based on the optimal transmission power allocation determined in block 1702, which is based on the wideband scheduling metric. A second type of conflict may occur when a UE is scheduled with MUST transmission in one subband but a OMA transmission in another subband.

The UEs and/or the MUST UE candidate sets may be sorted according to the subband scheduling metric for each subband. The sorted lists may be stored for later use.

For each subband, the better of MUST transmission or OMA transmission is selected. The selection may be according to the scheduling metric, such as a proportional fairness (PF) metric.

Figure 13:
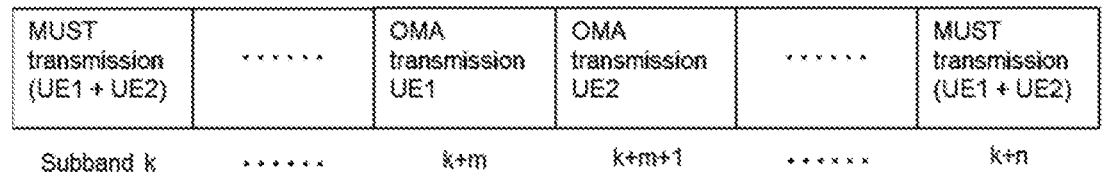
FIG. 13 is a scheduling diagram illustrating an example of scheduling conflicts between OMA and MUST.
Figure 14:
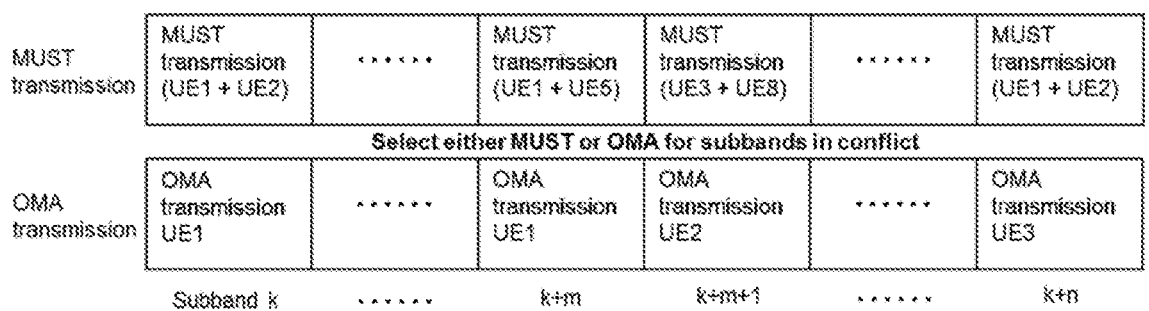
FIG. 14 is a scheduling diagram illustrating resolution of the scheduling conflicts shown in FIG. 13, according to some embodiments.

It is then determined whether there is a third type of conflict at this subband stage (block 1716). There is a conflict, for example, when a UE is scheduled with MUST transmission in some subbands and OMA transmission in other subbands, as shown in FIG. 13, where both UE1 and UE2 use different transmission schemes in different subbands. In this case, subband k, k+m, k+m+1 and k+n are all regarded as in conflict. Conflict resolution is conducted by retaining either MUST transmission or OMA transmission for all the subbands in conflict. The best of these two alternatives is adopted as the final scheduling decision. FIG. 14 illustrates how this conflict resolution works for the subband conflict shown in FIG. 13. There are two different ways to resolve this third type of conflict.

One way involves rescheduling all of the rest of the subbands with the transmission scheme that is the same as the retained transmission scheme for the subbands that are in conflict. For example, if MUST or OMA transmission is retained for the subbands in conflict, then MUST or OMA transmission is simply adopted for all the subbands (block 1722). The best scheme is selected between retaining MUST and retaining OMA for all the subbands once there is subband in conflict (blocks 1718 and 1720). This selection may be based on comparing the aggregate performance of a scheme over all of the subbands. This is basically selection between OMA subband scheduling and MUST subband scheduling.

Another way involves, for each subband in conflict and scheduled with a transmission scheme opposite to the retained transmission scheme, altering the transmission scheme to the retained transmission scheme. Then, the best scheme is selected between retaining MUST and retaining OMA for the subbands in conflict. This selection may also be based on comparing the aggregate performance over the subbands in conflict.

Note that there is no need to re-search the best UE for subbands because the best MUST UE pairs are already found in steps 1702-1706. The best OMA UE is found in step 1714, for each subband. Also note that the proposed scheduling in principle always guarantees a gain over the OMA subband scheduling. Furthermore, the selection based on an aggregate performance over multiple subbands will decrease the impact of any measurement error.

The resolution of the first type of conflict in steps 1702-1712 for UE candidate sets for MUST makes the subsequent subband scheduling easier as a first type of conflict (interference cancellation scheduled in some subbands but not for other subbands) is mitigated. Repeated rescheduling of subbands, as explained for prior proposals is not performed. Instead the best scheme between MUST and OMA is selected when there is a conflict. The actions limit the complexity increase, while at the same time retaining a large part of the benefit from subband (frequency selective) scheduling. This is because subband scheduling is still performed for OMA and MUST respectively. Furthermore, aggregated performance-based conflict resolution can be better than per UE-based conflict resolution.

Signaling Aspects

Relying on a single OMA channel state information (CSI) report per UE for MUST may lead to rank mismatch, which could arise due to the difference in the power allocated to the UE in MUST mode as compared to the OMA mode. This problem is particularly prominent for near UEs since the near UE power share is typically chosen to be (distinctly) lower than 0.5. This also leads to a CSI mismatch problem whenever there is a rank mismatch between the OMA mode and the MUST mode. To mitigate this, it has been proposed that multiple CSI reports are allowed to be reported by the UE. The multiple CSI reports may correspond to different data transmission power levels, different rank restrictions, etc.

However, one issue is the increased signaling overhead, which is especially evident when multiple subband CSI reports are needed for subband scheduling. On the other hand, conflict resolution for UE candidate MUST sets is based on a wideband scheduling metric, where subband CSI reports are not really needed. Considering this advantage, the UE signaling overhead can be reduced in the following ways.

In one example, multiple subband CSI reports are sent initially, e.g., within a time threshold, corresponding to different scenarios or hypotheses (e.g. different power allocations to the UE and whether it acts as a far UE or a near UE). Multiple wideband CSI reports are sent (together with the OMA subband CSI reports) if the UE is determined to be a far UE during the conflict resolution for UE candidate MUST sets. More generally, this may also be when the power share of the far UE exceeds a predefined level so that it is acceptable to use the single OMA CSI report per subband.

In another example, multiple wideband CSI reports are only reported in the beginning, and multiple subband CSI reports that correspond to different hypotheses (e.g. MUST or OMA tentative scheduling or actual scheduling) are reported only if the UE is determined to be a near UE during the conflict resolution for UE candidate MUST sets. More generally, the multiple subband reports are sent if the power share of the UE is lower than a predefined level since using the single OMA CSI report per subband for this UE will result in the CSI mismatch problem mentioned above. As a result, the UE signaling is controlled to send the channel information that is useful for the scheduling method described. This allows the signalling overhead to be reduced with no (or little) impact on system performance.

Additional signaling from the base station may be needed for the network to inform the UE to change the report mode, but this increased overhead should be limited because conflict resolution is based on a wideband scheduling metric. Therefore, the resolution results should change relatively slowly. Besides, the additional signaling is not needed for UEs that have once scheduled with MUST transmission, as they will know if they are scheduled as a near UE or a far UE, and can act accordingly.

According to some embodiments, the method 1600 may also include sending configuration to a UE in a UE candidate set of a reduced set. The configuration information may include reporting instructions. For example, the configuration information may instruct the UE to report channel information corresponding to a MUST scenario associated with a particular transmit power allocation. In LTE, this channel information may be CSI. However, while CSI is used in various examples, the channel information is not limited to CSI. The configuration information may also instruct the UE to report wideband channel information corresponding to one or more MUST transmission scenarios, only in response to a determination by the network node that the UE has a MUST position of a far UE or that a power share of the UE is greater than a predetermined level. The configuration information may instruct the UE to report subband channel information corresponding to MUST transmission scenarios, only in response to a determination by the network node that the UE has a MUST position of a near UE or that a power share of the UE is less than a predetermined level. In a further example, the UE determines the channel information to be reported based on a determination of other information received from the base station, e.g., scheduling information.

In some cases, a subband channel information is reported only for corresponding MUST scenarios associated with a transmit power allocation indicated in configuration information received from the wireless communication network.

Figure 19:
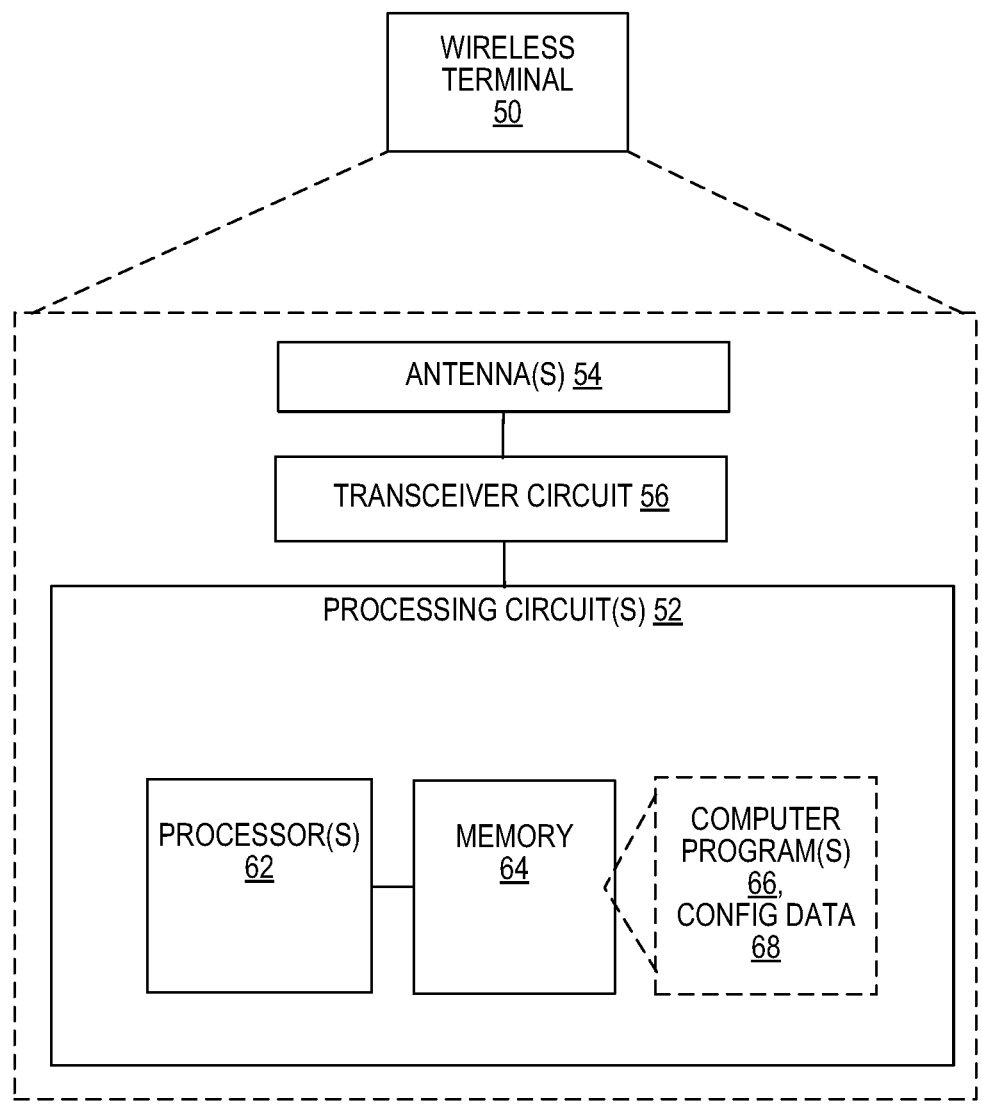
FIG. 19 illustrates a block diagram of a wireless terminal configured to perform scheduling, according to some embodiments.

FIG. 19 illustrates a diagram of a wireless terminal 50, according to some embodiments. To ease explanation, the wireless terminal 50 may also be considered to represent any wireless devices that may operate in a network, such as a UE 50. The UE 50 herein can be any type of wireless device capable of communicating with network node or another UE over radio signals, such as UE1 10 or UE2 20 shown in FIG. 1. The UE 50 may also be radio communication device, target device, device to device, D2D, UE, machine type UE or UE capable of machine to machine communication, M2M, a sensor equipped with UE, PDA (personal digital assistant), Tablet, mobile terminals, smart phone, laptop embedded equipped, LEE, laptop mounted equipment, LME, USB dongles, Customer Premises Equipment, CPE, etc.

The UE 50 communicates with a radio node or base station, such as the radio access network node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processor(s) 62 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50 of a wireless communication network may be configured to be scheduled for transmission in a band comprising a plurality of subbands. According to some embodiments, the processing circuit 52, by way of a processor(s) 62 executing a computer program 66 in memory 64, is configured to report subband channel information corresponding to MUST and OMA transmission scenarios for each of a plurality of subbands. The processing circuit 52 is also configured to selectively report wideband channel information corresponding to all of the plurality of subbands, in response to configuration information received from a base station in response to a determination by the base station that the wireless terminal may occupy a MUST position of a far UE.

In some embodiments, the processing circuit 52 is configured to report channel information (e.g., CSI), via the transceiver circuit 56, to the wireless communication network. The processing circuit 52 is configured to report subband channel information corresponding to MUST and/or OMA transmission hypotheses for the plurality of subbands. The processing circuit 52 is also configured to report wideband channel information corresponding to MUST transmission scenarios for the entire band and subband channel information corresponding to OMA transmission scenarios for the plurality of subbands only in response to a determination by the processing circuit 52 that the UE 50 has a MUST position of a far UE.

In other embodiments, the processing circuit 52 is configured to report to the wireless communication network, wideband channel information corresponding to MUST transmission scenarios for the entire band and subband channel information corresponding to OMA transmission scenarios for the plurality of subbands, and report a subband channel information corresponding to MUST and OMA transmission scenarios for the plurality of subbands only in response to a determination by the processing circuit 52 that the UE 50 has a MUST position of a near UE.

Different scenarios may be adopted for MUST and OMA CSI reports, including scenarios, or hypotheses, on power, rank, precoding matric indicator (PMI), etc. For instance, a MUST near UE is allocated less power than when it is scheduled as a OMA UE, so two power hypotheses may be needed for MUST and OMA, respectively.

Figure 20:
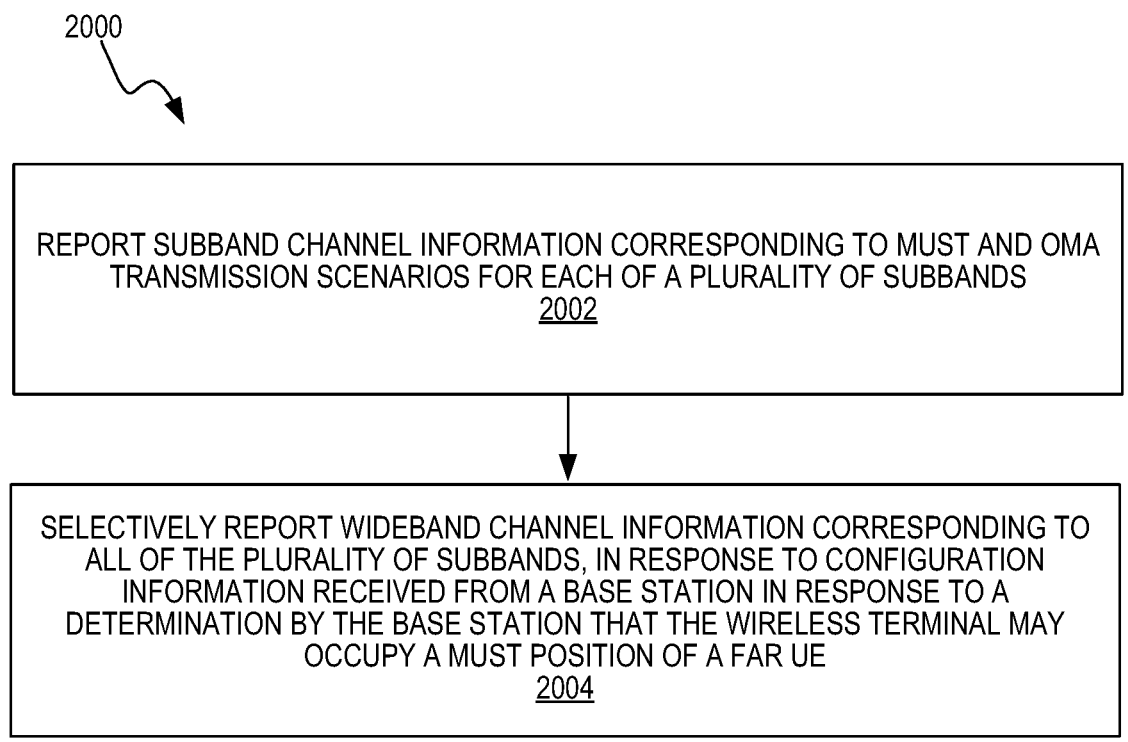
FIG. 20 is a flowchart illustrating an example reporting method, according to some embodiments.

The processing circuit 52 is configured to perform the UE-related methods described herein. For example, the processing circuit 52 is configured to perform the method 2000 shown in FIG. 20. UE 50 is to be scheduled for transmission in a band comprising a plurality of subbands. The method 2000 includes reporting subband channel information corresponding to MUST and OMA transmission scenarios for each of a plurality of subbands (block 2002). The method 2000 also includes selectively reporting wideband channel information corresponding to all of the plurality of subbands, in response to configuration information received from a base station in response to a determination by the base station that the wireless terminal may occupy a MUST position of a far UE. In further examples, the UE may operate a method according to any other example method described herein.

Figure 21:
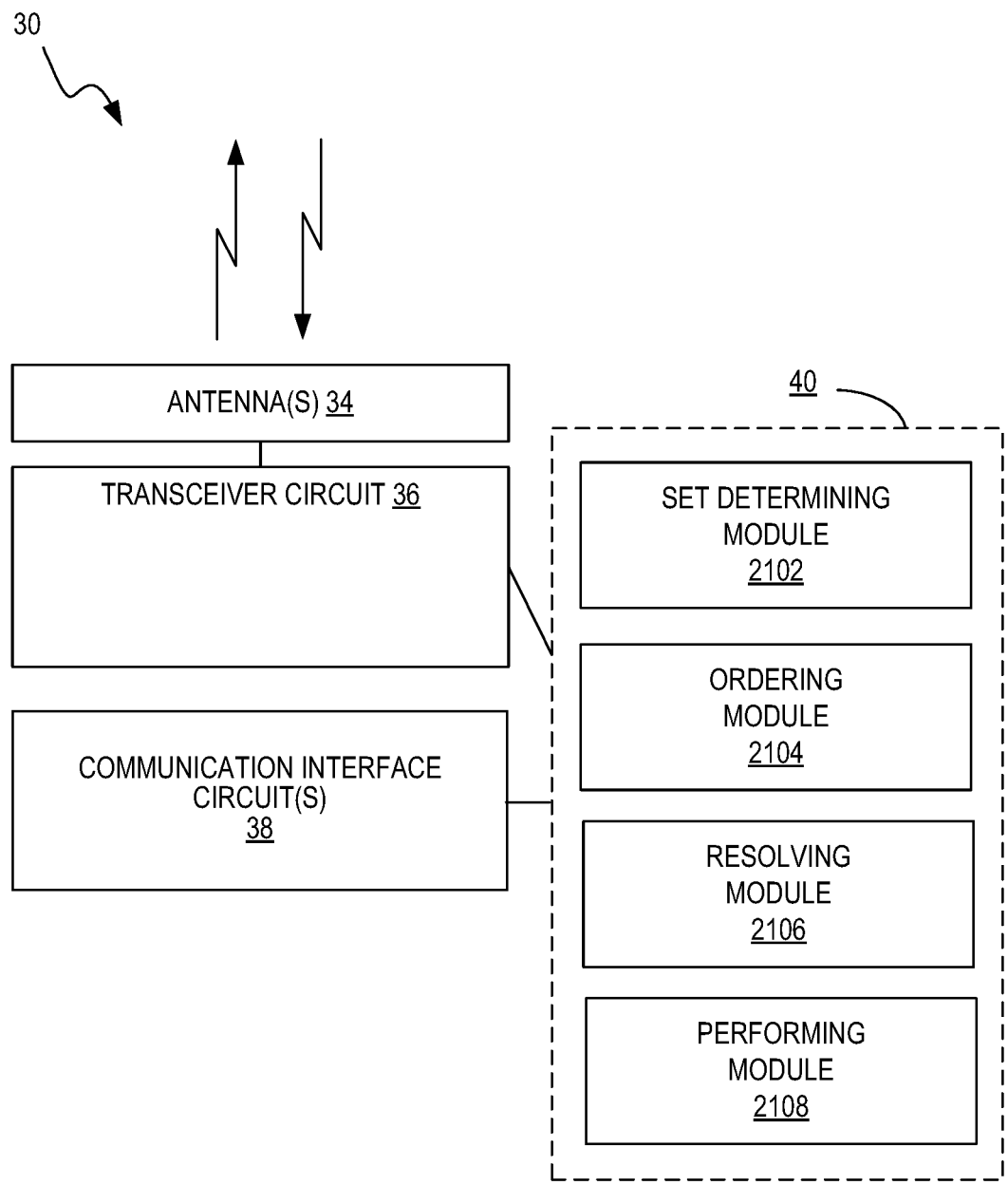
FIG. 21 illustrates a functional implementation of a radio access network node, according to some embodiments.

FIG. 21 illustrates an example functional module or circuit architecture as may be implemented in the radio access network node 30, e.g., based on the processing circuit 32. The illustrated embodiment at least functionally includes a set determining module 2102 for determining a plurality of UE candidate sets for MUST scheduling in a band comprising a plurality of subbands, where each UE candidate set comprises a first UE in a near MUST position and a second UE in a far MUST position. The implementation includes an ordering module 2104 for ordering the plurality of UE candidate sets according to a scheduling performance metric for each UE candidate set, where each scheduling performance metric is evaluated with respect to the entire band. The implementation includes a resolving module 2106 for resolving MUST pairing conflicts by excluding, from the plurality of UE candidate sets, any UE candidate set that includes a UE that (a) is also present in a UE candidate set having a better scheduling performance metric and (b) has an inconsistent MUST position for interference cancellation with respect to the UE candidate set having the better scheduling performance metric, to obtain a reduced set of UE candidate sets. The implementation includes a performing module 2108 for performing subband scheduling on each subband of the plurality of subbands, using either MUST scheduling or OMA transmission scheduling, and wherein the reduced set of UE candidate sets is used for MUST scheduling.

Figure 22:
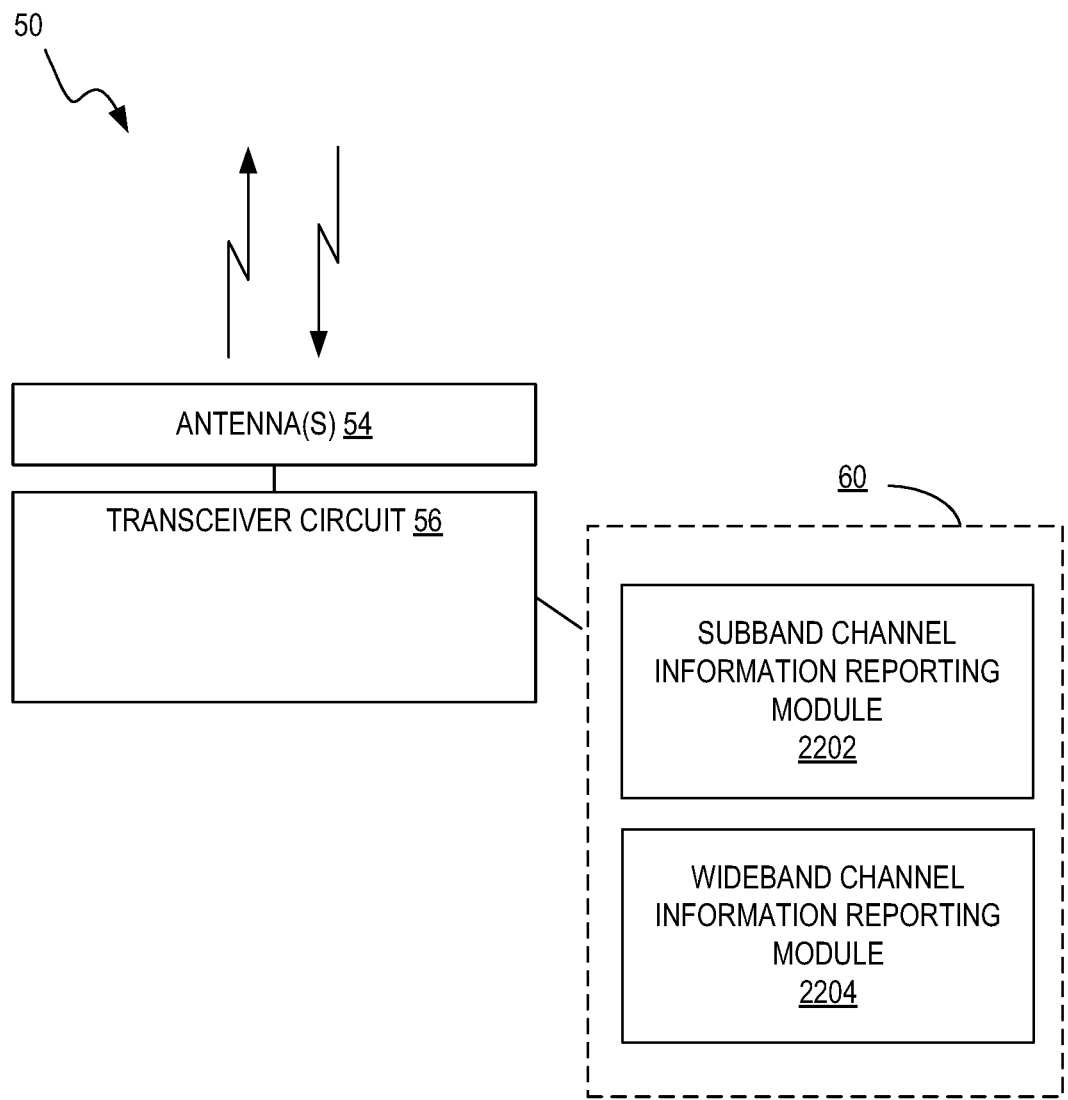
FIG. 22 illustrates a functional implementation of a wireless terminal, according to some embodiments.

FIG. 22 illustrates an example functional module or circuit architecture as may be implemented in the wireless terminal 50, which is to be scheduled for transmission in a band comprising a plurality of subbands. The illustrated embodiment at least functionally includes a subband channel information reporting module 2202 for reporting subband channel information corresponding to MUST and OMA transmission scenarios for each of a plurality of subbands. The implementation also includes a wideband channel information reporting module 2204 for selectively reporting wideband channel information corresponding to all of the plurality of subbands, in response to configuration information received from a base station in response to a determination by the base station that the wireless terminal may occupy a MUST position of a far UE.

Embodiments of the present invention obtain the major benefit of subband scheduling with only a moderate complexity increase in MUST. This is because conflict resolution, in some embodiments, is based on a wideband scheduling metric or an aggregated metric over multiple subbands. Some advantages may also be due to the separate subband scheduling schemes for OMA and MUST, based on the conflict resolution output for UE candidate MUST sets. Selection of the best scheme between OMA and MUST, when there is a conflict, is either for the whole band or for the bands in conflict. In some cases, only a wideband CSI is reported specifically for MUST operation (together with the OMA subband CSI reports) if the UE is determined to be a far UE during the conflict resolution for candidate MUST user sets.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a radio access network node of a wireless communication network, the method comprising:
   determining a plurality of user equipment (UE) candidate sets for Multi-User Superposition Transmission (MUST) scheduling in a band comprising a plurality of subbands, wherein each UE candidate set comprises a first UE in a near MUST position and a second UE in a far MUST position;
   ordering the plurality of UE candidate sets according to a scheduling performance metric for each UE candidate set, wherein each scheduling performance metric is evaluated with respect to the entire band;
   resolving MUST pairing conflicts by excluding, from the plurality of UE candidate sets, any UE candidate set that includes a UE that (a) is also present in a UE candidate set having a better scheduling performance metric and (b) has an inconsistent MUST position for interference cancellation with respect to the UE candidate set having the better scheduling performance metric, to obtain a reduced set of UE candidate sets; and
   performing subband scheduling on each subband of the plurality of subbands, using either MUST scheduling or Orthogonal Multiple Access (OMA) transmission scheduling, wherein the reduced set of UE candidate sets is used for MUST scheduling.

2. The method of claim 1, wherein performing subband scheduling on each subband of the plurality of subbands comprises, for each of one or more of the subbands:
   performing a tentative scheduling on the subband, using OMA scheduling;

performing a tentative scheduling on the subband, using MUST scheduling;

selecting MUST scheduling or OMA scheduling for the subband, based on which provides a better scheduling performance metric for the subband; and scheduling the subband according to the selecting.

3. The method of claim 2, wherein the use of MUST scheduling or OMA transmission scheduling for each subband is selected based on a subband-specific scheduling performance metric for the subband.

4. The method of claim 1, wherein determining the plurality of UE candidate sets comprises identifying, for each UE candidate set, a transmit power allocation providing a best wideband scheduling performance metric for the respective UE candidate set among a plurality of possible transmit power allocations, wherein the best wideband scheduling performance metric is used to determine the scheduling performance metric for the respective UE candidate set.

5. The method of claim 4, wherein the resolving further comprises excluding, from the plurality of UE candidate sets, any UE candidate set that includes a UE that (c) is also present in a UE candidate set having a better scheduling performance metric and (d) has a different transmit power allocation with respect to the UE candidate set having the better scheduling performance metric.

6. The method of claim 4, wherein the resolving further comprises identifying, from among the plurality of UE candidate sets, any UE candidate set that includes a UE that (c) is also present in a UE candidate set having a better scheduling performance metric and (d) has a different transmit power allocation with respect to the UE candidate set having the better scheduling performance metric, and resetting the transmit power allocation for the identified UE candidate set to match the transmit power allocation in the UE candidate set having the better scheduling performance metric.

7. The method of claim 1, wherein the method further comprises:

identifying scheduling conflicts in which any given UE is scheduled for MUST in one subband and for OMA transmission in another subband; and resolving the scheduling conflicts by:

determining a total scheduling performance metric for using only MUST scheduling in the subbands that are affected by the identified scheduling conflicts;

determining a total scheduling performance metric for using only OMA transmission scheduling in the subbands that are affected by the identified scheduling conflicts; and rescheduling UEs in the subbands that are affected by the identified scheduling conflicts using either only MUST scheduling or only OMA transmission scheduling, in response to a comparison of the total scheduling performance metrics.

8. The method of claim 1, further comprising sending configuration information to a UE in a UE candidate set of the reduced set, instructing the UE to report channel information corresponding to a MUST scenario associated with a particular transmit power allocation.

9. The method of claim 1, further comprising sending configuration information to a UE, instructing the UE to report wideband channel information corresponding to one or more MUST transmission scenarios, only in response to a determination that the UE has a MUST position of a far UE or a determination that a power share of the UE is greater than a predetermined level.

10. The method of claim 1, further comprising sending configuration information to a UE, instructing the UE to report subband channel information corresponding to MUST transmission scenarios, only in response to a determination that the UE has a MUST position of a near UE or a determination that a power share of the UE is less than a predetermined level.

11. A radio access network node of a wireless communication network, comprising:

a transceiver circuit configured to send and receive wireless signals; and a processing circuit operatively connected to the transceiver circuit and configured to:

determine a plurality of user equipment (UE) candidate sets for Multi-User Superposition Transmission (MUST) scheduling in a band comprising a plurality of subbands, wherein each UE candidate set comprises a first UE in a near MUST position and a second UE in a far MUST position;

order the plurality of UE candidate sets according to a scheduling performance metric for each UE candidate set, wherein each scheduling performance metric is evaluated with respect to the entire band;

resolve MUST pairing conflicts by excluding, from the plurality of UE candidate sets, any UE candidate set that includes a UE that (a) is also present in a UE candidate set having a better scheduling performance metric and (b) has an inconsistent MUST position for interference cancellation with respect to the UE candidate set having the better scheduling performance metric, to obtain a reduced set of UE candidate sets; and perform subband scheduling on each subband of the plurality of subbands, using either MUST scheduling or Orthogonal Multiple Access (OMA) transmission scheduling, wherein the reduced set of UE candidate sets is used for MUST scheduling.

12. The radio access network node of claim 11, wherein the processing circuit is configured to:

perform subband scheduling on each subband of the plurality of subbands by, for each of one or more of the subbands:

performing a tentative scheduling on the subband, using OMA scheduling;

performing a tentative scheduling on the subband, using MUST scheduling;

selecting MUST scheduling or OMA scheduling for the subband, based on which provides a better scheduling performance metric for the subband; and scheduling the subband according to the selecting.

13. The radio access network node of claim 11, wherein the processing circuit is configured to:

select the use of MUST scheduling or OMA transmission scheduling for each subband based on a subband-specific scheduling performance metric for the subband.

14. The radio access network node of claim 11, wherein the processing circuit is configured to:

identify, for each UE candidate set, a transmit power allocation providing a best wideband scheduling performance metric for the respective UE candidate set among a plurality of possible transmit power allocations, wherein the best wideband scheduling performance metric is used to determine the scheduling performance metric for the respective UE candidate set.

15. The radio access network node of claim 14, wherein the processing circuit is configured to:
    identify, from among the plurality of UE candidate sets, any UE candidate set that includes a UE that (c) is also present in a UE candidate set having a better scheduling performance metric and (d) has a different transmit power allocation with respect to the UE candidate set having the better scheduling performance metric; and
    reset the transmit power allocation for the identified UE candidate set to match the transmit power allocation in the UE candidate set having the better scheduling performance metric.

16. The radio access network node of claim 14, wherein the processing circuit is configured to:
    exclude, from the plurality of UE candidate sets, any UE candidate set that includes a UE that (c) is also present in a UE candidate set having a better scheduling performance metric and (d) has a different transmit power allocation with respect to the UE candidate set having the better scheduling performance metric.

17. The radio access network node of claim 11, wherein the processing circuit is configured to:
    identify scheduling conflicts in which any given UE is scheduled for MUST in one subband and for OMA transmission in another subband; and
    resolve the scheduling conflicts by:
        determining a total scheduling performance metric for using only MUST scheduling in the subbands that are affected by the identified scheduling conflicts;
        determining a total scheduling performance metric for using only OMA transmission scheduling in the subbands that are affected by the identified scheduling conflicts; and
        rescheduling UEs in the subbands that are affected by the identified scheduling conflicts using either only MUST scheduling or only OMA transmission scheduling in response to a comparison of the total scheduling performance metrics.

18. The radio access network node of claim 11, wherein the processing circuit is configured to:
    send, via the transceiver circuit, configuration information to a UE in a UE candidate set of the reduced set, instructing the UE to report channel information corresponding to a MUST scenario associated with a particular transmit power allocation.

19. The radio access network node of claim 11, wherein the processing circuit is configured to:
    send, via the transceiver circuit, configuration information to a UE, instructing the UE to report wideband channel information corresponding to one or more MUST transmission scenarios, only in response to a determination that the UE has a MUST position of a far UE or a determination that a power share of the UE is greater than a predetermined level.

20. The radio access network node of claim 11, wherein the processing circuit is configured to:
    send, via the transceiver circuit, configuration information to a UE, instructing the UE to report subband channel information corresponding to MUST transmission scenarios, only in response to a determination that the UE has a MUST position of a near UE or a determination that a power share of the UE is less than a predetermined level.

21. A method, in a wireless terminal of a wireless communication network that is to be scheduled for transmission in a band comprising a plurality of subbands, the method comprising:
    reporting subband channel information corresponding to Multi-User Superposition Transmission (MUST) and Orthogonal Multiple Access (OMA) transmission scenarios for each of a plurality of subbands; and
    selectively reporting wideband channel information in addition to reporting the subband channel information, in response to receiving an indication from a base station that the wireless terminal is considered by the base station to be a far terminal for purposes of MUST scheduling of near/far terminal pairs by the base station, the wideband channel information corresponding to all of the plurality of subbands.

* * * * *